United States Patent
White et al.

(10) Patent No.: US 6,252,362 B1
(45) Date of Patent: Jun. 26, 2001

(54) METHOD AND APPARATUS FOR SYNCHRONIZING PWM SINUSOIDAL DRIVE TO A DC MOTOR

(75) Inventors: Bertram J. White, Irvine, CA (US); Michael Arkin, Dallas, TX (US); Vincent Ng, Alhambra, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/448,571

(22) Filed: Nov. 23, 1999

(51) Int. Cl.[7] ............... H02K 23/00; H02P 1/18; H02P 3/08; H02P 5/06; H02P 7/06

(52) U.S. Cl. ............. 318/254; 318/599; 318/439; 318/138; 318/459; 388/811; 388/813; 388/829; 388/911

(58) Field of Search ................. 318/254, 599, 318/439, 138, 459, 437, 606, 607, 608; 388/928.1, 911, 811, 813, 829, 804, 805, 820, 831; 363/41

(56) References Cited

U.S. PATENT DOCUMENTS

| 4,399,395 | * | 8/1983 | Espelage | 318/803 |
|---|---|---|---|---|
| 4,544,868 | * | 10/1985 | Murty | 318/254 |
| 4,814,674 | | 3/1989 | Hrassky. | |
| 4,916,370 | * | 4/1990 | Rowan et al. | 318/368 |
| 5,319,289 | * | 6/1994 | Austin et al. | 318/254 |
| 5,631,999 | | 5/1997 | Dinsmore. | |
| 5,672,948 | * | 9/1997 | Cohen et al. | 318/603 |
| 5,783,917 | * | 7/1998 | Takekawa | 318/439 |
| 5,798,623 | | 8/1998 | El-Sadi. | |
| 5,838,515 | | 11/1998 | Mortazavi et al.. | |
| 5,869,946 | | 2/1999 | Carbolante. | |
| 6,081,112 | * | 6/2000 | Carobolante et al. | 324/177 |

* cited by examiner

Primary Examiner—Robert E. Nappi
Assistant Examiner—Edgardo San Martin
(74) Attorney, Agent, or Firm—W. Daniel Swayze, Jr.; W. James Brady; Frederick J. Telecky, Jr.

(57) ABSTRACT

A method and circuit for operating a polyphase dc motor in which discontinuous sinusoidal drive voltages are applied to the windings of the motor in predetermined phases. The discontinuous portion of the sinusoid is timed with the bemf zero crossings. Bemf zero crossings are detected, and phases of the drive voltages are adjusted to have zero crossings substantially in the discontinuities of the drive voltages. The method and circuit result in motor operation with significantly reduced acoustic motor noise.

3 Claims, 9 Drawing Sheets

| SCHEME | FAST VMAG | |
|---|---|---|
| | TORQUE RIPPLE | d/dt TORQUE |
| Sin 10 | 2.5% | 1.9K |
| Sin 30 | 5.5% | 3.6K |
| Trap-60-120 10 | 11% | 2.2K |
| Trap-60-120 30 | 14% | 3.8K |
| Trap-90-30-30-30 30 | 17% | 4.8K |
| Six State | 25% | 7.1K |

*UNITS OF (d/dt TORQUE) ARE VOLT-AMPS/SEC

METHOD AND APPARATUS FOR SYNCHRONIZING PWM SINUSOIDAL DRIVE TO A DC MOTOR

FIELD OF THE INVENTION

The present invitation relates to electronic circuits for driving polyphase magnetic motors. More particularly, the present invention relates to a driver circuit for driving a brushless polyphase permanent magnet motor.

BACKGROUND OF THE INVENTION

A hard disk drive generally includes a stack of rotating disks or platters, a spindle motor which causes the disks to rotate, read/write heads which fly above the surface of the disks, an actuator motor (known as a "voice coil motor" or VCM) which controls the positioning of the read/write heads, power circuitry to provide electrical power to the spindle and voice coil motors and control circuitry to control the operation of the spindle and voice coil motors.

A read/write head reads data from the disks by sensing flux changes on the magnetic surface of the disk as it passes beneath the read/write head. To synchronize the data being read from the disk with the operation of the data processing circuitry, it is required to carefully control the rotation of the disks and provide a smooth and silent operation. This is usually accomplished by controlling the current delivered to the spindle motor.

Current control can be effected in two ways. The first is pulse width modulation, in which a driving voltage is modulated by a square wave. The duty cycle of the pulse width modulation signal determines the average voltage applied to the spindle motor. In turn, the voltage determines the amount of current delivered to the spindle motor. The other mode of current control is known as linear current control. In this mode, an analog voltage input signal is provided which is proportional to the current to be delivered to the spindle motor. The spindle motor control circuitry processes the input signal and adjusts the level of current delivered by the power circuitry accordingly.

The three-phase brushless motor is one of the most widely used types of spindle motor which has current energizing respective coils using a full wave bridge configuration. The bridge includes two power stages, one for each phase, so typically there are six power stages each with a power device. Three of the power stages and their power devices are referred to as "low side" stages and devices because they are connected between the motor coil and ground. The other three of these power stages and their power devices are referred to as "high side" stages and devices because they are connected between the power supply and the motor coil.

The power devices are operated as switches in a sequence that allows pulses of current to flow from the power supply through a high-side power device, a coil of the first of the three stages, a coil of the second of the three stages, and then through a low-side power device to ground. The power device may include a power driver or FET. This process is repeated in a generally well-known manner for the other power devices and coil pairs to achieve three-phase energization from a single, direct current, power supply. The switching or commutation characteristics of the power devices are very important in achieving good performance from the motor and other favorable characteristics.

Conventional control circuits produce, at the driver outputs, rectangular driving pulses, causing in the windings current pulses having a current path that depends on the amplitude of the driving pulses, the winding inductance, and on the motor voltage (emf voltage). The rapid voltage and current changes at the driver outputs, caused by the rectangular driving pulses, lead to kick-back pulses or "flyback pulses" which are caused by a sudden magnetic discharge of an abruptly turned-off inductor, as it is generally known.

Rapid current changes and the flyback pulses cause problems. On one hand, they cause loud motor noises that are disturbing for the user, for example, of any hard disk drive. On the other hand, due to their high-frequency content, the flyback pulses cause strong electromagnetic radiation. This may lead to considerable disturbances in the apparatus equipped with the motor as well as in other apparatus. The heads may be located near to the disturbances. In order to counteract such disturbances, a known control circuit for a brushless motor has an RLC filter connected between each driver output and the associated winding terminal of the motor. By means of these filters, it is possible to slope the edges of the driving pulses reaching the motor windings. In this manner, it is possible to avoid the occurrence of electromagnetic disturbances on the lead wires to the motor windings as well as on the motor windings. However, due to the inductances of the RLC filters, flyback pulses are still present at the driver outputs of the control circuit. Thus, disturbing electromagnetic radiation still occurs at the site of the driver outputs.

Additionally, efficient motor drive requires that the excitation current in the three motor phases be aligned with the BEMF generated by the three phases. One scheme for achieving this alignment is the use of a phase-locked loop (PLL). The PLL adjusts the phase and frequency of the commutation so that the BEMF of the undriven (tri-stated) windings passes through zero in the center of the appropriate commutation state. This scheme works well when the shape of the commutation waveform includes an undriven region, as in a conventional 6-state, +1, +1, 0, -1, -1, 0, sequence. In addition to the undesirable acoustic noise, this step-function tri-stating of the undriven motor phases, together with the step-function driving waveform produces a degree of torque ripple in the motor. This torque ripple results in an unevenness or jerkiness in the motor rotation, which also excites resonances in the motor, causing undesirable acoustic noise.

Thus, if it is desired to reduce acoustic noise, a sine wave shaped excitation signal may be more appropriate than a 6-state sequence. If the motor driver consists of a sinusoidal current source, the same voltage sensing PLL described above can be used. In the case of PWM sinusoid drive, the motor phases are repetitively driven between ground and the supply. As a result, no bemf information can be extracted from them as input to the PLL. Nevertheless, PWM drive is highly desirable in order to minimize power dissipation in the driver IC. This permits lower cost packaging and an overall saving in system cost.

There has been recent emphasis on disk drive manufacturers to reduce the noise associated with disk drive motors. Consequently, what is needed is a disk drive and method for operating it in which the noise associated with the drive in operation is reduced or eliminated.

SUMMARY OF THE INVENTION

The present invention provides a way to synchronize the drive voltages to a DC permanent magnetic motor when the motor is driven with pulse width modulated (PWM) waveforms. The circuit is useful when the waveforms are sinusoidal or some other shape intended to reduce the acoustic noise of the motor. When the drive waveforms are properly synchronized, the drive waveforms cause a current in the motor windings that is in phase with the back EMF of the motor.

DETAILED DESCRIPTION OF THE PRESENT INVENTION

Figure 1:
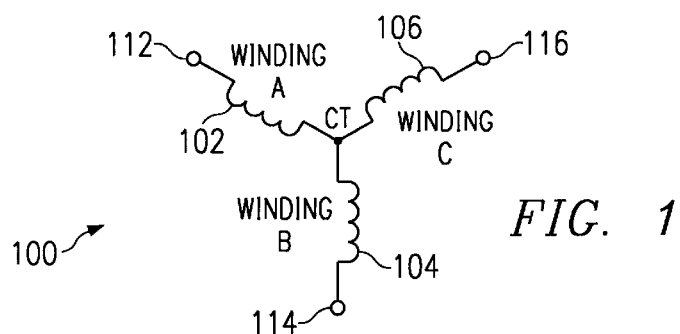
FIG. 1 illustrates a DC motor.

Due to the inductance of motor windings, such as illustrated in FIG. 1, the drive voltages tend to lead the winding current in phase. The amount of lead of the phase depends on the value or magnitude of the inductance. The circuit of the present invention synchronizes the drive voltages so they have a specific or predetermined phase lead with respect to the back electromagnetic force (BEMF). If the phase lead is maintained in accordance with the predetermined phase lead, the winding current will essentially be in phase with the BEMF. The predetermined phase lead can be modified slightly to compensate for differences between the motor voltage observed during the high-impedance discontinuities and the actual back EMF of the motor. An input signal called PHADJ by the present invention selects the amount of phase lead between the phase of the drive voltage and the winding current.

FIG. 1 illustrates a DC motor 100 having three terminals and three windings 102, 104 and 106. The current in the motor depends on the voltage across each of the windings 102, 104 and 106. Although three phases are shown, the present invention could use other numbers of phases. In the case of sinusoidal drive voltages, it is desirable to select phase voltages at terminals 112, 114 and 116 so the voltage across or between the three windings is essentially sinusoidal. Typically, the center tap CT node is not driven, and assuming the windings are similar in construction, the center tap has a voltage that is the average voltage of the three terminals 112, 114 and 116. There may be many waveform sets that are applied to terminals 112, 114 and 116 that accomplish sinusoidal winding voltages.

Figure 2:
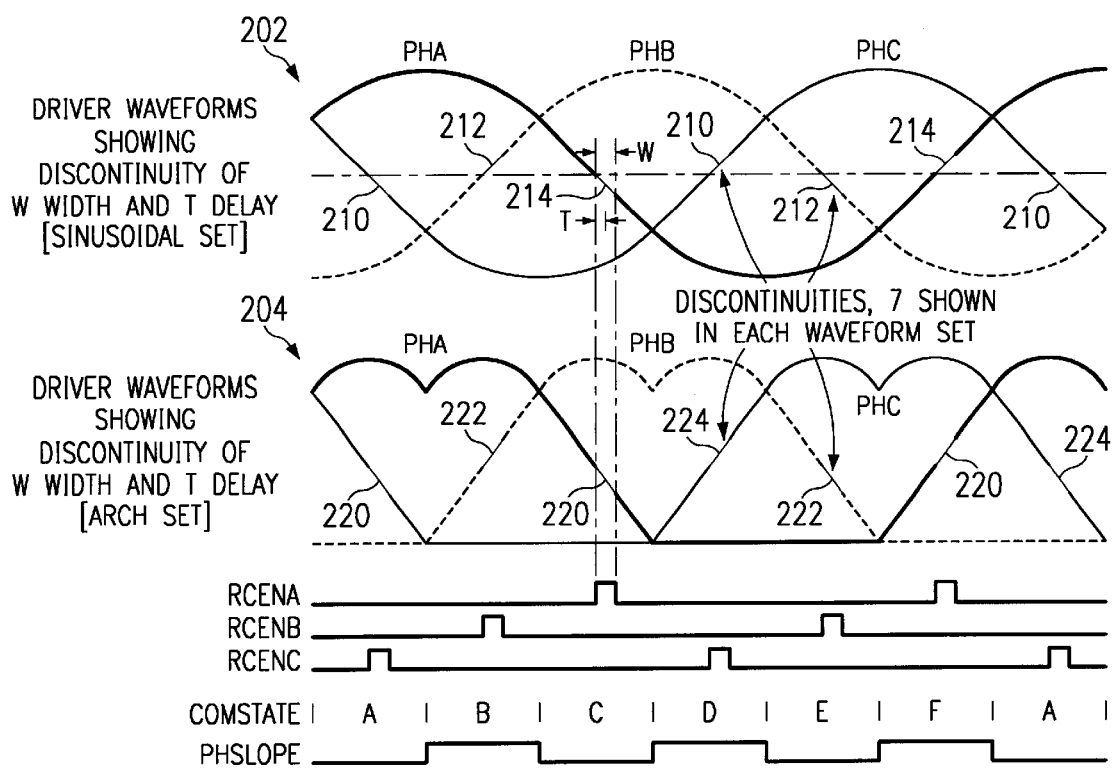
FIG. 2 illustrates a sinusoidal waveform and arch waveform set.

FIG. 2 illustrates two waveform sets, a first waveform set 202 and a second waveform set 204. Each of these waveform sets 202 and 204 causes sinusoidal voltages to be applied across the motor windings 102, 104 and 106. The first set 202, which approximates a sinusoid, includes three separate sinusoids 120° apart. If VMAG represents the amplitude of the sinusoids, the waveform set 202 is represented by Equation 1.

$$PHA = VMAG \sin(wt)$$
$$PHB = VMAG \sin(wt+240) \quad (1)$$
$$PHC = VMAG \sin(wt-240)$$

where PHA is the voltage applied to terminal 112
PHB is the voltage applied to terminal 114
PHC is the voltage applied to terminal 116

A second set of waveforms can be derived from the sinusoidal set 202 by subtracting the minimum of the three sinusoids. This set of voltages is sometimes referred to as arch waveforms 204. The arch waveform set has the advantage that one of the motor phases is always 0, thus minimizing the amount of PWM switching in the motor terminals. Equation 2 describes the voltages of arch waveform set.

$$PHA = VMAG\ (\sin(wt) - \min\{\sin(wt),\ \sin(wt-120),\ \sin(wt-240)\})$$
$$PHB = VMAG\ (\sin\ (wt-120) - \min\{\sin(wt),\ \sin(wt-120),\ \sin(wt-240)\}) \quad (2)$$
$$PHC = VMAG\ (\sin(wt-240) - \min\{\sin(wt),\ \sin\ (wt-120),\ \sin(wt-240)\})$$

where PHA is the voltage applied to terminal 112
PHB is the voltage applied to terminal 114
PHC is the voltage applied to terminal 116

As shown in FIG. 2, a small discontinuity of width W and time delay T is inserted in each voltage waveform by turning off the driver (making the impedance of the driver high) for a brief period of time when the BEMF of each phase is expected to pass through zero. In this embodiment, the user specifies T with PHADJ and W with HIZ. For a sinusoid, the discontinuity for waveform PHC is illustrated by element 210, the discontinuity for waveform PHA is illustrated by element 214, and the discontinuity for PHB is illustrated by element 212. In a similar fashion, for arch waveforms, the discontinuity for PHA is illustrated by element 220, for PHB by element 222, and for PHC by element 224. While the driver is at high impedance, the voltage difference between the voltage of each phase and the center tap will be the back EMF voltage of the winding. A phase detector then monitors the back EMF voltage and adjusts the speed for the phase of the drive voltages so the BEMF passes through zero exactly in the center of the discontinuity.

Note that the voltages applied to the terminals 112, 114 and 116 lead the winding current. Since the circuit is attempting to align the BEMF with winding current, the location of the discontinuity is slightly past the time when the voltage applied to the terminals 112, 114 and 116 is zero.

If the waveforms 202 and 204, illustrated in FIG. 2, were applied to the motor terminals 112, 114 and 116, significant power would be dissipated in the driver amplifiers. Amplifier power loss is minimized by pulse width modulating the waveforms.

Figure 3:
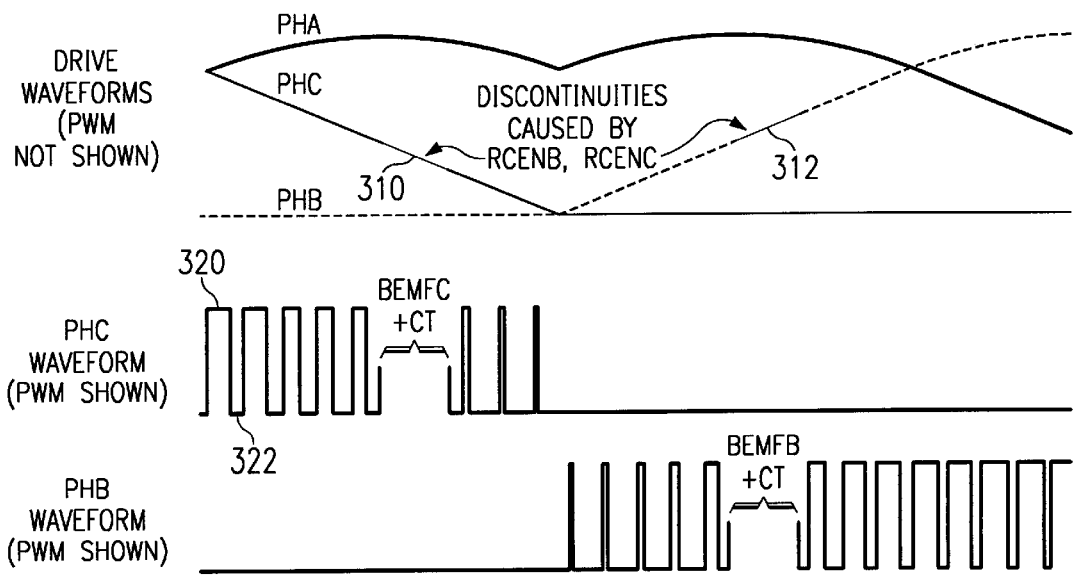
FIG. 3 illustrates a pulse width modulated version of the arch waveforms.

FIG. 3 illustrates the discontinuity in PHC by element 310 and the discontinuity in PHB by element 312. FIG. 3 illustrates the PWM version of the arch waveform set. During the time that the linear amplifier would have been on (low impedance), the waveform PHC is forced either high, shown by element 320, or low, shown by element 322. The average value of the output during each PWM cycle corresponds to the voltage that would have been generated by the linear amplifier. As in the linear case, discontinuity which is caused by the impedance of the device being high is introduced when the BEMF is expected to pass through zero. During the discontinuity, the voltage of the phase will be the value of the bemf summed with the voltage of the CT.

Figure 4:
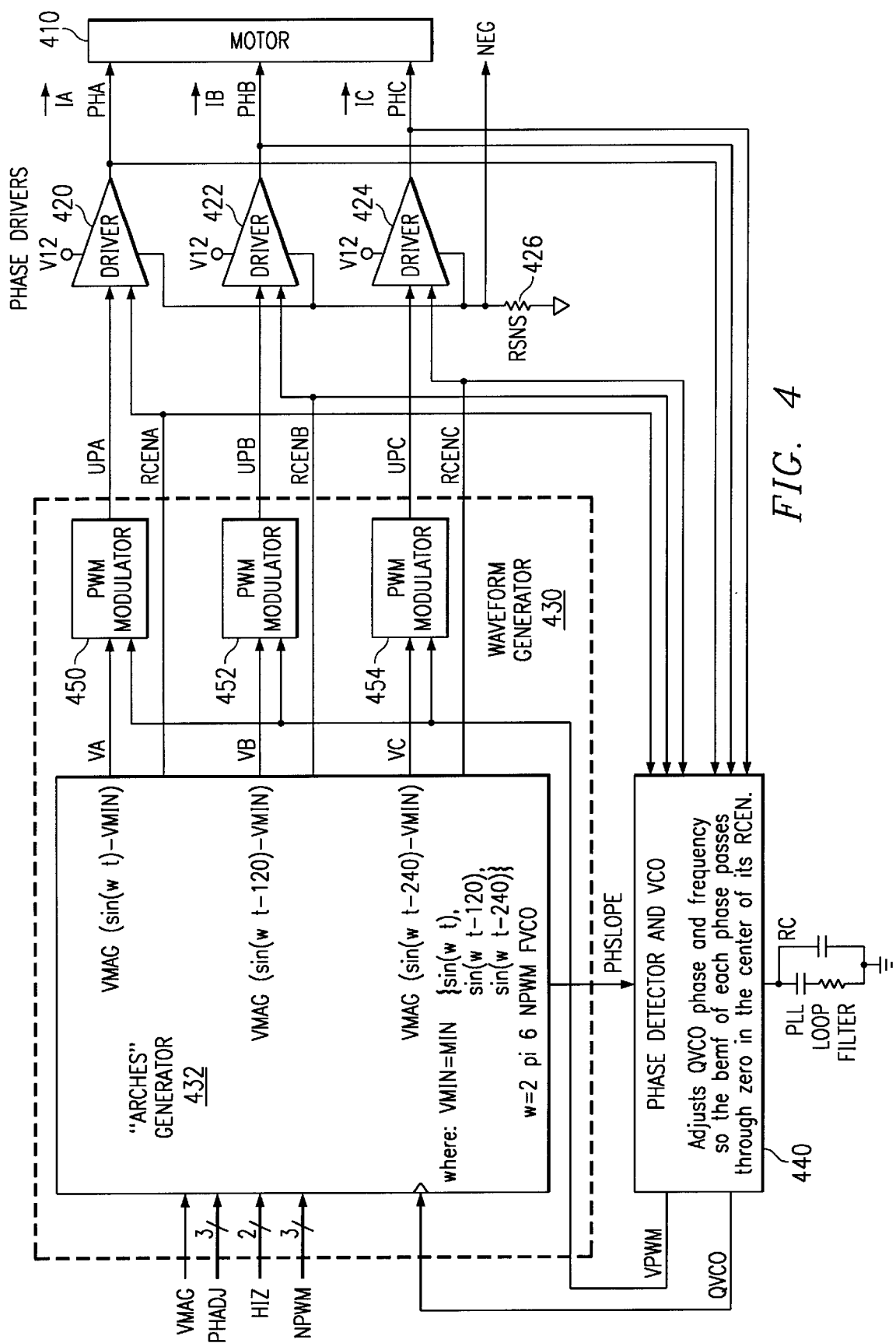
FIG. 4 illustrates a phase-locked loop.

A phase-locked loop of the present invention is illustrated in FIG. 4. The phase-locked loop includes a waveform generator 430, which is connected to phase drivers 420, 422 and 424, which is in turn connected to a motor 410; phase detector and VCO 440, which is connected to the waveform generator 430 and motor 410 and phase drivers 420, 422 and 424. The waveform generator 430 includes an arches generator 432 connected to pulse width modulator 450, pulse width modulator 452, and pulse width modulator 454. Input to the arches generator 432 is signal VMAG which controls the amplitude of the voltages input to phase drivers 420, 422 and 424, signal PHADJ, signal HIZ which determines the width of the RCEN windows in QVCO cycles, and signal NPWM which is the number of QVCO clock signals per COMSTATE signal. Output from the arches generator 432 is the VA signal, the VB signal, and the VC signal which are analog drive voltages which are converted to signals UPA, UPB and UPC by the pulse width modulator circuits 450, 452 and 454. Additionally, an output signal from the arches generator 432 is a PHSLOPE signal which is a digital signal indicating to the phase detector if the BEMF voltage is expected to be rising or falling. The waveform generator 430 includes pulse width modulator 450 which inputs the VA signal and the VPWM signal which is a triangular wave used as a reference input to all of the pulse width modulator circuits and output from the phase detector and VCO circuit 440. Likewise, the pulse width modulator 452 inputs the VB signal as well as the VPWM signal. Lastly, the pulse width modulator 454 inputs the VC signal and the VPWM signal. Furthermore, other output signals from the arches generator are the RCENA signal, the RCENB, and the RCENC signal. These are phase detector enable signals. When these signals are high, the phase detector 440 monitors the back EMF zero crossings of PHA, PHB or PHC. These signals also cause the phase drivers 420, 422 and 424 to enter their high impedance state. The output signals PHA, PHB and PHC from the phase drivers 420, 422 and 424 are input to motor 410. More specifically, the phase driver 420 inputs the UPA signal and the RCENA signal and outputs the PHA signal to motor 410. Driver 422 inputs the UPB signal and the RCENB signal and outputs the PHB signal to motor 410. Likewise, phase driver 424 inputs the UPC signal and the RCENC signal and outputs the PHC signal to motor 410. Additionally, the RCENA signal, the RCENB signal, and the RCENC signal are input to the phase detector and VCO circuit 440. The PHA signal, the PHB signal, and the PHC signal are input to the phase detector and VCO circuit 440. The phase detector and VCO circuit 440 outputs the QVCO signal which is the output from the VCO output. The QVCO signal is a dock signal that is input to the waveform generator 430. The phase driver circuit 420, the phase driver circuit 422, and the phase driver circuit 424 are connected to a sense resistor 426 to sense the current through the motor, allowing control of the motor through the current and the corresponding voltage drop.

Figures 5, 7:
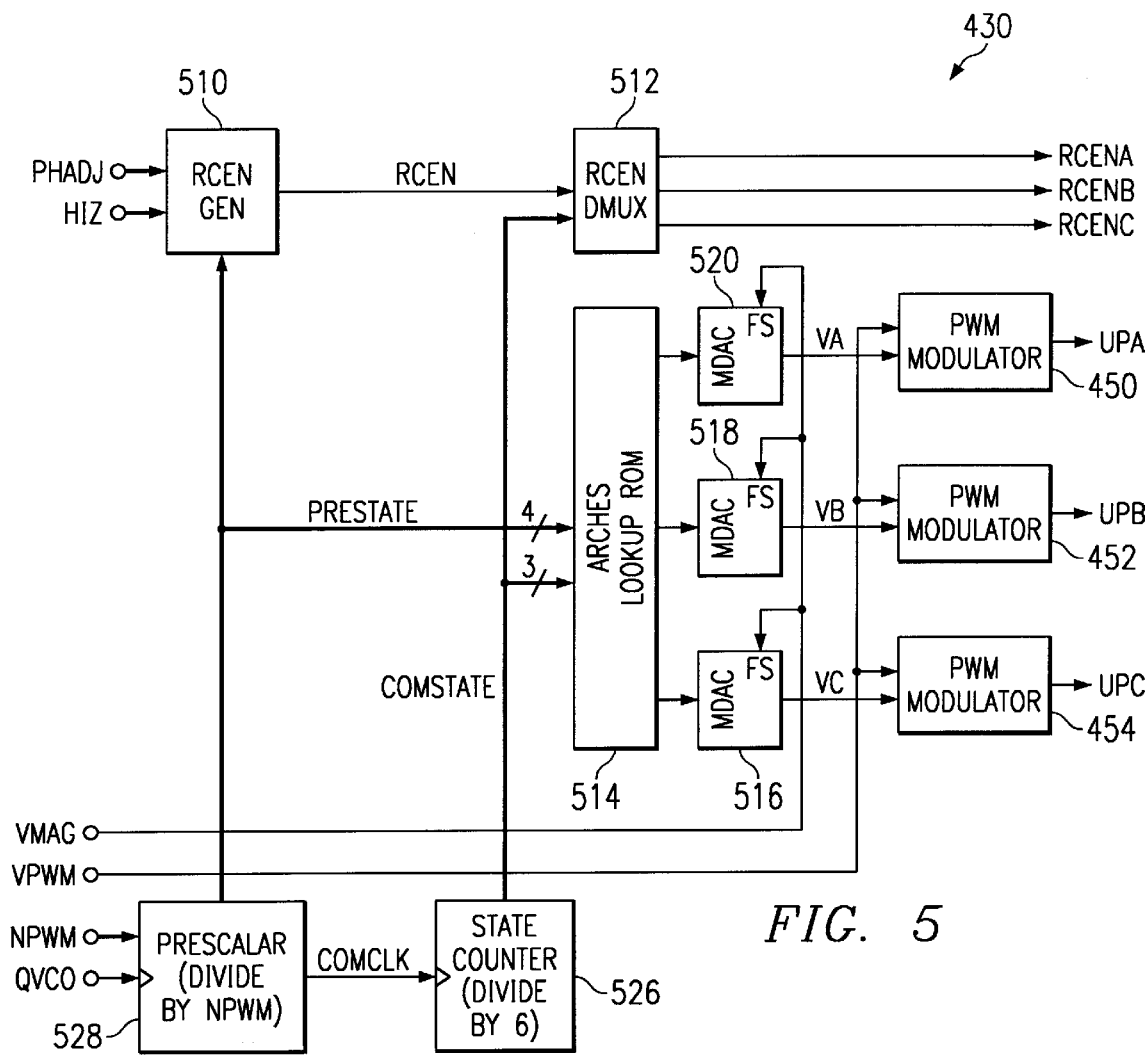
FIG. 5 illustrates a waveform generator.
FIG. 7 illustrates the advantages of the present invention.

The waveform generator 430 is illustrated in FIG. 5. The waveform generator 430 generates the UPA signal, the UPB signal, and the UPC signal from the VCO signal, and the waveform generator 430 inputs the VMAG signal and other additional signals such as the PHADJ signal, the HIZ signal, the QVCO signal, and the NPWM signal. The description of the waveform generator 430 serves to describe the function of one implementation of the waveform generator and not a required implementation. One of the arch waveforms is typically grounded, and an equivalent circuit for the waveform generator could be formed using two MDAC (multiplying DAC) circuits and two pulse width modulators. As a consequence, an alternative might be to calculate the VA signal, the VB signal, and the VC signal waveforms rather than use a lookup ROM.

The waveform generator 430 includes a prescalar counter circuit 528 connected to a state counter circuit 526 and to RCEN generator circuit 510, which is connected to an RCEN demultiplexer circuit 512. The prescalar counter circuit 528 and the state counter circuit 526 are connected to a lookup ROM 514, which is connected to MDAC circuit 520, MDAC circuit 518, MDAC circuit 516, which are connected to pulse width modulator circuit 450, pulse width modulator circuit 452, and pulse width modulator circuit 454, respectively.

The RCEN generator circuit 510 inputs the PHADJ signal and the HIZ signal and outputs an RCEN signal which is a generic phase detector enable signal. When high, the phase detector circuit 440 monitors the BEMF zero crossings associated with the PHA signal, PHB signal, or PHC signal. These signals also cause the phase driver circuits 420, 422 and 424 to enter their high impedance state. The RCEN signal is output from the RCEN generator 510 and input to the RCEN demux circuit 512. A prescalar signal is output from the prescalar counter circuit 528 and input to the RCEN generator 510. Additionally, the PRESTATE signal is input to the lookup ROM 514. The RCEN signal indicates that one of the RCENA signal, RCENB signal, and RCENC signal is asserted. The PRESTATE signal is a portion of the ROM address for the lookup ROM 514. The prescalar counter circuit 528 inputs the NPWM signal which is the number of QVCO clock signals per COMSTATE signal. Additionally, the prescalar counter circuit 528 inputs the QVCO signal which is the output from the VCO. The QVCO is the clock input to the waveform generator. The output of the prescalar counter circuit is the COMCLK signal which is a clock signal which is input to the state counter circuit 526. The state counter sequences through the six COMSTATES shown in FIG. 2 and in FIG. 11. The output of the state counter circuit 526 is a COMSTATE signal which is input to the RCEN demux circuit 512. Output from the RCEN demux circuit 512 is the RCENA signal, RCENB signal, and RCENC signal. These signals are attained by the selection of the RCEN signal in accordance with the COMSTATE signal. The output from the lookup ROM 514 is input to the MDAC circuit 520, the MDAC circuit 518, and the MDAC circuit 516. The output of the MDAC circuit 520 is a VA signal which is input to pulse width modulator 450. The output from the MDAC circuit 518 is a VB signal and is input to the pulse width modulator circuit 450, and the output from the MDAC circuit 516 is a VC signal and is input to the pulse width modulator circuit 454. The PRESTATE signal forms part of the address used in the lookup ROM 514. The COMSTATE signal forms the remainder of the ROM address. The signals RCENA, RCENB and RCENC force the phase drivers 420, 422, 424 into high impedance and enable the phase detector charge pump. The lookup ROM circuit 514 and the MDAC circuits 520, 518 and 516 generate the arch waveforms VA signal, VB signal, and VC signal. These waveforms are then pulse width modulated by PWM circuit 450, PWM circuit 452 and PWM circuit 454 to generate the UPA signal, UPB signal, and UPC signal, respectively.

Figure 6:
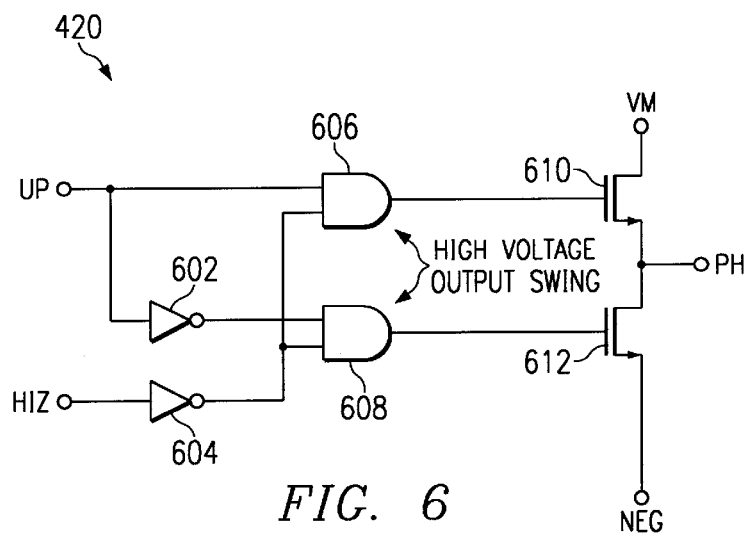
FIG. 6 illustrates a block diagram of the output driver.

FIG. 6 illustrates a block diagram of the output driver. The output driver could be from a number of similar circuits, and output driver 420 is illustrated, although such a circuit could be used for driver 422 and driver 424. A typical output buffer includes two large output devices which are typically DMOS. These devices are shown as elements 610 and 612.

Depending on logic inputs, the buffer either pulls the output signal PH high or pulls it low or lets it float. The PH signal could be PHA signal, PHB signal or PHC signal. The logic of circuit 420 is such that when the HIZ signal is asserted, the PH signal will be floated. Otherwise, it will be pulled up or down in accordance with the UP signal. Additional features of the output driver typically include rise and fall time control of the PH signal and provision for operation during other spindle modes such as start, brake and emergency retract. The output driver includes two FETs connected in series, namely a high-side FET 610 and a low-side FET 612. An UP signal which may include UPA, UPB or UPC is the pulse width modulator of the analog drive voltages. These UP signals are typically digital signals which, when high, cause their respective PH signal to be forced high. The UP signal is input to inverter 602 and AND circuit 606. A HIZ signal is input to the inverter 604. The output of inverter 604, an inverted HIZ signal, is input to AND circuit 606 and AND circuit 608. The output of inverter 602, an inverted UP signal, is input to AND circuit 608. The output of AND circuit 606 is input to the gate of FET 610 and consequently controls FET 610. Likewise, the output of AND circuit 608 is input to the gate of FET 612 which in turn controls FET 612.

Figure 10:
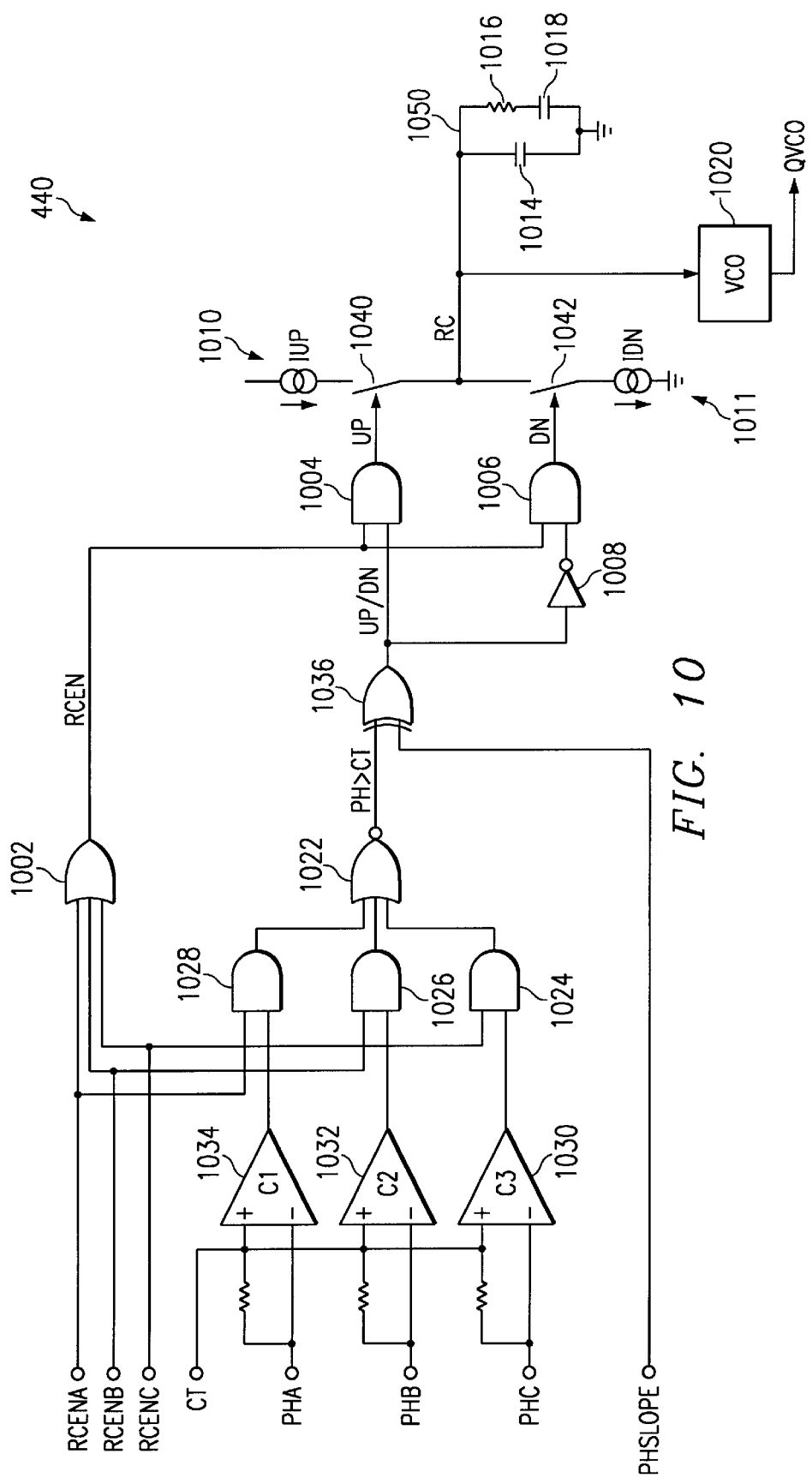
FIG. 10 illustrates the phase detector and VCO.
Figure 11:
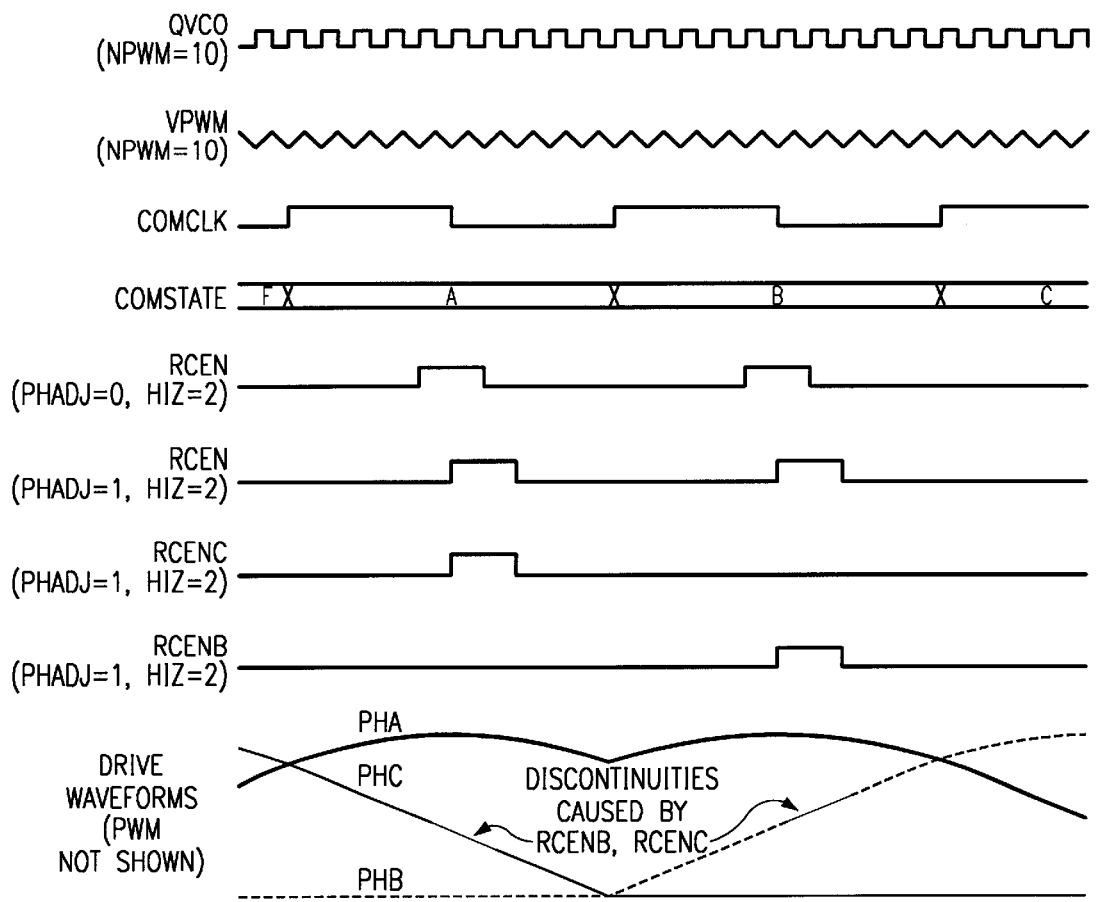
FIG. 11 illustrates drive waveforms.

FIG. 10 illustrates the phase detector and VCO circuit 440. The purpose of the phase detector is to determine the phase error between the drive waveforms and the motor's bemf. Detection of the bemf phase is made possible by the high impedance discontinuities inserted in the phase driver waveforms. These discontinuities are illustrated in FIG. 11. When the drive waveforms and motor bemf are exactly in lock, the bemf of each phase will pass through zero in the middle of the discontinuities of that phase. The phase detector adjusts the phase of the driver by adjusting the voltage at RC. During each discontinuity, the phase detector discharges RC before the zero crossing occurs and then charges it after the zero crossing. No charging or discharging occurs outside of the discontinuities. Since the charge and discharge rates are the same, if the zero crossing is early, there will be more charging than discharging, and the RC voltage will rise. This, in turn, will cause the VCO to speed up, and the phase of the drive waveforms to advance. Thus the discontinuity will occur earlier and become better centered around the zero crossing.

There are many implementations of the phase detector circuit 440 which will detect the phase of the back EMF relative to the windows of the RCEN signal. FIG. 10 illustrates one such implementation. Whenever one of the RCEN signals, namely RCENA signal, RCENB signal, or RCENC signal, rises to indicate a discontinuity, one of the RC current sources 1010 or 1011 is enabled. The polarity of the current source, either up or down, is controlled by the selected phase by selecting current source 1010 or current source 1011 and whether or not it is expected to be rising or falling. The RC current is filtered by the impedance of the loop filter 1050. The resulting voltage of the loop filter 1050 at capacitor 1014 controls the frequency of the signal QVCO. The signals RCENA, RCENB and RCENC are input to OR circuit 1002. Additionally, the RCENA signal is input to AND circuit 1028. The signal RCENB is input to the AND circuit 1026, and the RCENC signal is input to the AND circuit 1024. The center tap voltage is input to comparator 1034 and input to comparator 1032 and input to comparator 1030. The PHA signal is input to comparator 1034. The PHB signal is input to comparator 1032, and the PHC signal is input to comparator 1030. The output of comparator 1034 is input to AND circuit 1028. The output of comparator 1032 is input to AND circuit 1026, and the output of comparator 1030 is input to AND circuit 1024. The comparators 1030, 1032 and 1034 output a logical 1 output when voltage of the center tap CT exceeds the phase voltage, namely PHA, PHB or PHC. The output of AND circuit 1028, the output of AND circuit 1026, and the output of AND circuit 1024 is input into NOR circuit 1022. The output of NOR circuit 1022 is input into OR circuit 1036. Additionally, the PHSLOPE signal is input to XOR circuit 1036. The output of XOR circuit 1036 is a UP/DN signal which is input to AND circuit 1004 and input to inverter 1008. An inverted UP/DN signal is output out of inverter 1008 and input to AND circuit 1006. The output of AND circuit 1004 is an UP signal, and the output of AND circuit 1006 is a DN signal which controls switches 1040 and 1042, respectively. The current source 1010 is input to the RC circuit 1050 when the UP signal closes the switch 1040. This tends to charge up filter circuit 1050. The filter circuit 1050 includes a capacitor 1014 in parallel with resistor 1016 and capacitor 1018. The output of the filter circuit is the VCO circuit 1020 which outputs the signal QVCO. The output of the XOR circuit 1022 is the selected phase being greater than the center tap. The charge pump 1011 operates in conjunction with switch 1042 to charge down the filter circuit 1050.

FIG. 7 illustrates the advantages of the present invention. The scheme sin 10 and sin 30 correspond to 10° and 30° discontinuities, respectively. The torque ripple for sin 10 is illustrated to be superior to other types of schemes based upon the conditions employed. In fact, it is nearly flat, which is the performance of ideal, discontinuity-free sinusoidal drive systems.

Referring to FIG. 10, the phase detector pumps the voltage on RC depending on the RCEN signals, the bemf signals, and PHSLOPE. In this embodiment, the phase detector is constantly comparing the three bemf voltages to their center tap. Between discontinuities, the comparator results have no effect on the RC voltage. When a discontinuity occurs, signalled by RCENA, RCENB, or RCENC, the phase detector pumps RC depending on the corresponding comparator output. The corresponding comparator output generates the signal PH>CT. If PHSLOPE is high, RC will be pumped up whenever the signal is one. If PHSLOPE is low, RC will be pumped up whenever the signal is zero. PHSLOPE indicates which COMSTATES have rising bemf zero crossings and is high during COMSTATE B, D, and F.

For example, a discontinuity can be signalled by RCENA, during COMSTATE C or F. If the discontinuity is signalled during COMSTATE C, RC will be pumped down while PHA is greater than CT and pumped up while PHA is less than CT.

Figure 12:
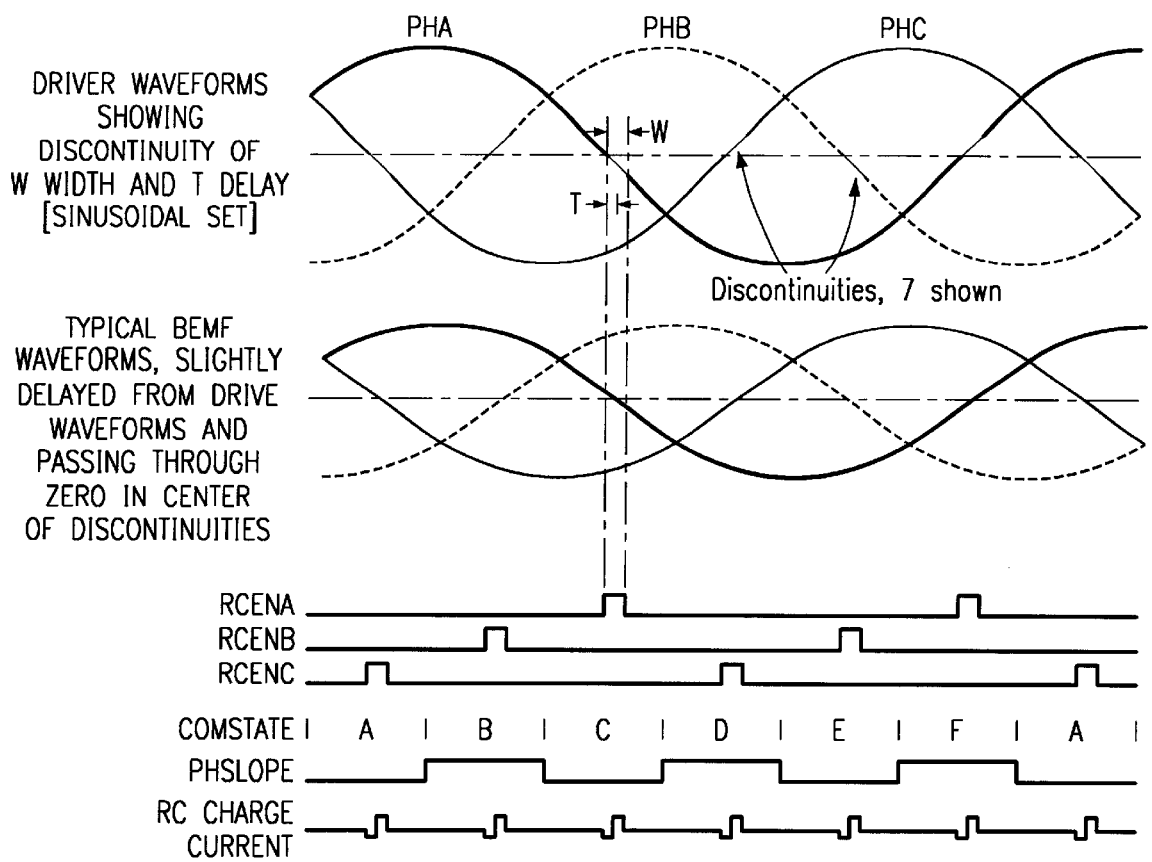
FIG. 12 illustrates additional drive waveforms.

FIG. 12 shows bemf waveforms and drive waveforms. The zero crossings of the bemf waveforms are centered in the RCEN windows indicating zero phase error between the driver waveforms and the motor bemf. As a result, the RC charge current pumps up and down for equal times, causing no net change to the RC voltage and no net change to the VCO frequency.

Figure 13:
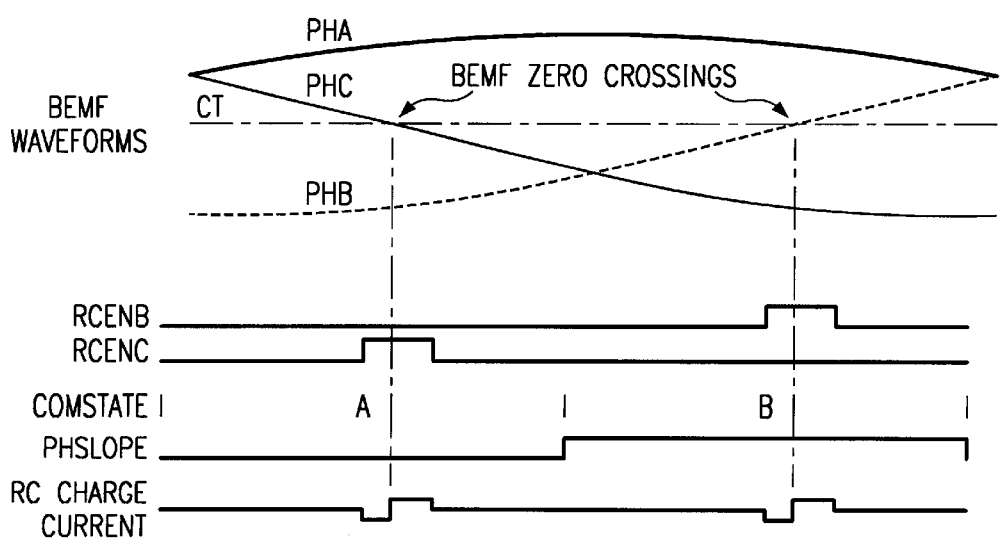
FIG. 13 illustrates phase detector waveforms.

FIG. 13 is an expanded view of the PHB and PHC zero crossings when the driver waveforms are a bit late. As a result, the bemf zero crossings are early in the RCEN windows, the pump up time is longer than the pump down time, and there is a net pump up at the RC node. The increased RC voltage will speed up the VCO, causing the RCEN discontinuities to be earlier and therefore moving the bemf zero crossings toward the center of the discontinuity.

Figure 8:
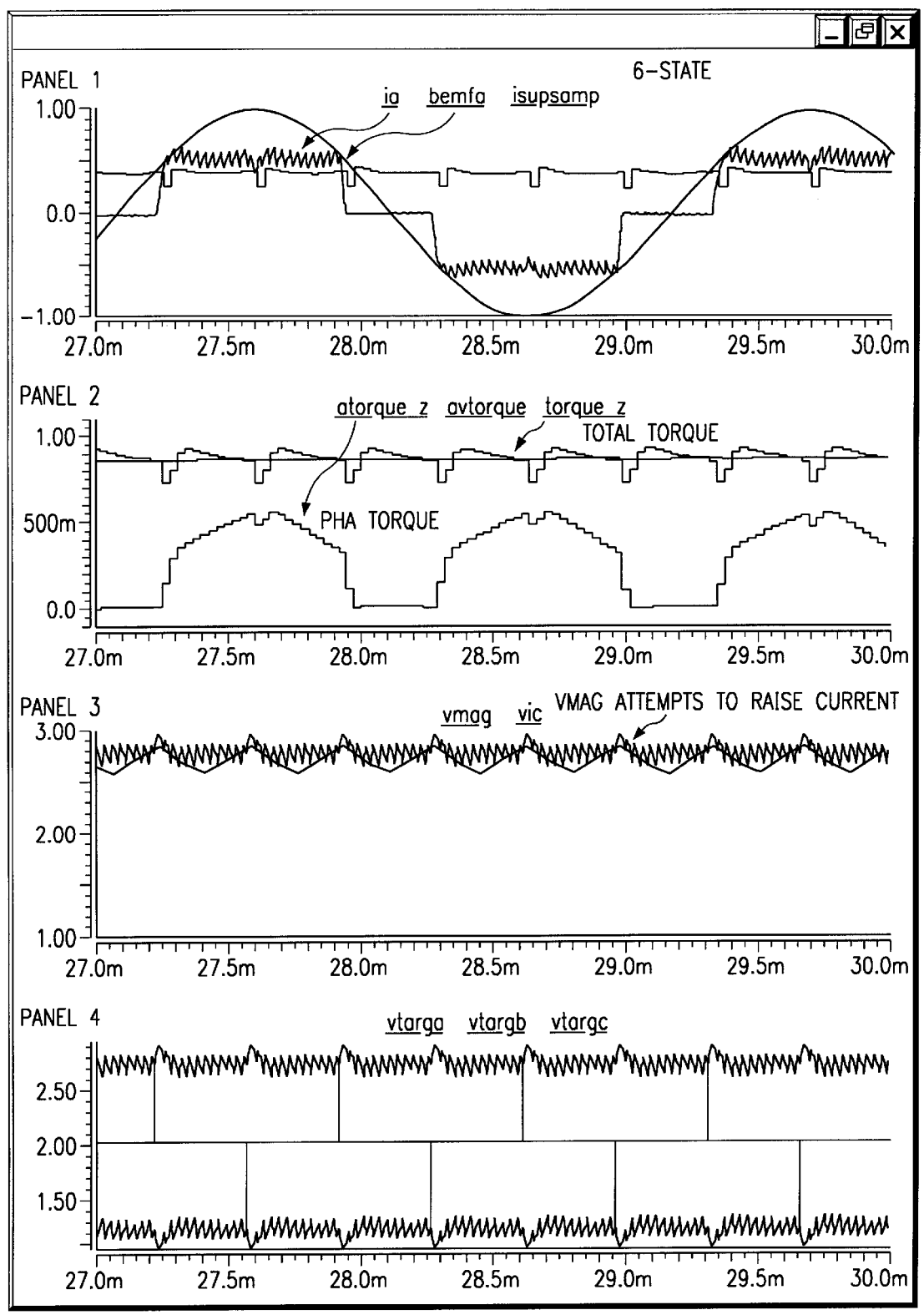
FIG. 8 illustrates waveforms of the prior art.
Figure 9:
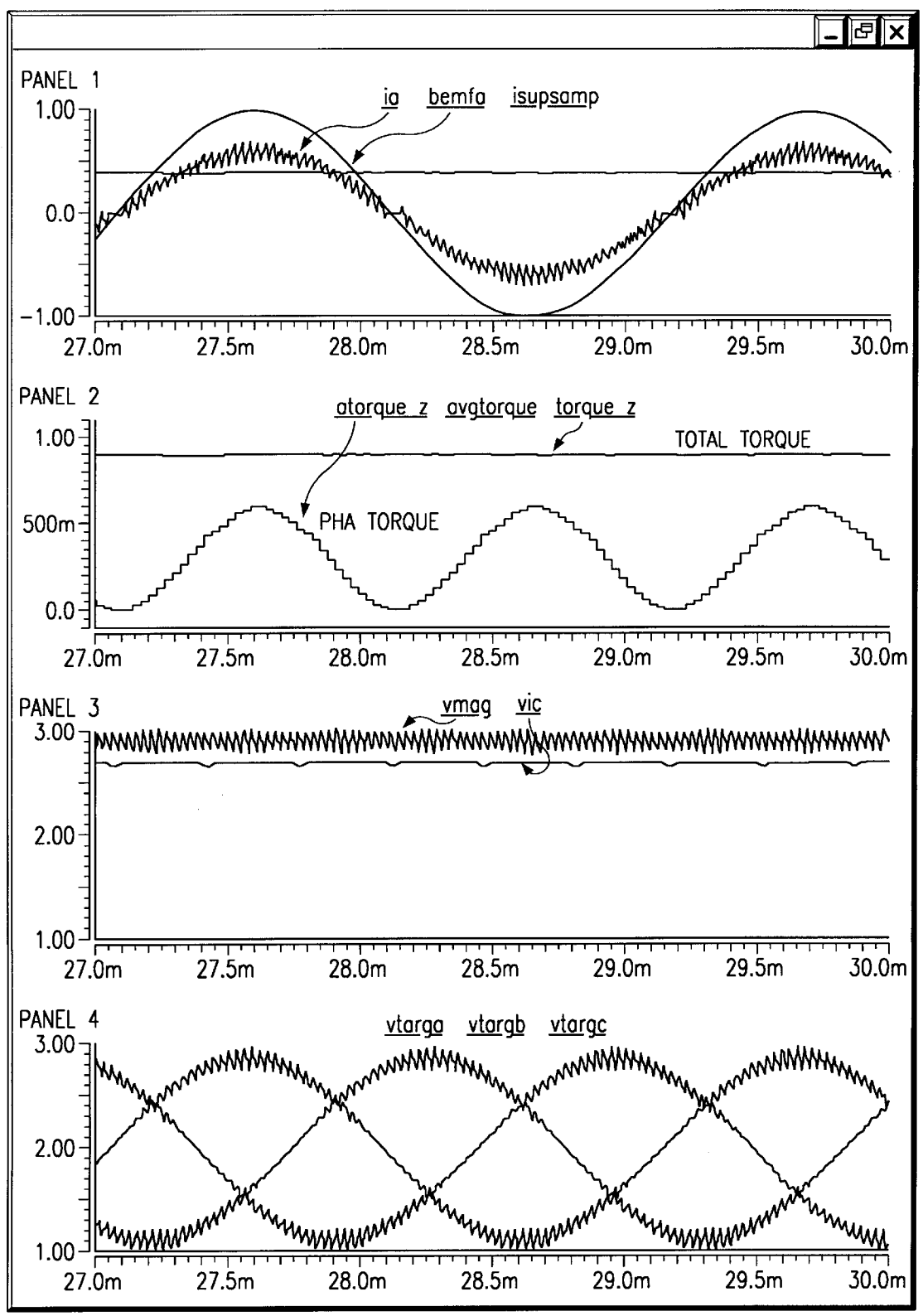
FIG. 9 illustrates waveforms of the present invention.

FIG. 8 illustrates the torque ripple for a 6-state system, and FIG. 9 in panel 2 illustrates the same results for a 10° HIZ signal.

While fewer than six discontinuities can be used, six discontinuities per electrical cycle were implemented. The width of the discontinuities may be selected to a predetermined width and could be based on an integer number of PWM cycles. In this embodiment, the user selects the width of the discontinuities by HIZ which selects a discontinuity width of 1, 2, 3, or 4 PWM cycles. The phase difference between drive voltages and bemf voltage may be selectable as an integer number of half PWM cycles. In this embodiment, the user selects the phase difference by PHADJ, which selects from 1 to 16 half-cycles of PWM.

The discontinuities of the present invention are typically less than 60°.

FIG. 11 shows that the discontinuities are controlled by the RCENB and RCENC signals. (The A phase is not shown.) These signals RCENA, RCENB and RCENC result in the respective phase driver circuits being turned on to a high impedance state which results in discontinuities in PHA, PHB and PHC.

What is claimed is:

1. A method for operating a polyphase dc motor, comprising the steps of:

applying discontinuous sinusoidal drive voltages to the windings of the motor in predetermined phases;

detecting zero crossings of current flowing in respective windings of the motor; and adjusting phases of the drive voltages to have zero crossings substantially simultaneously with the detected zero crossings of the currents flowing in respective windings of the motor, wherein said applying discontinuous sinusoidal drive voltages to the windings of the motor in predetermined phases comprises applying a discontinuity within 5% of said detected zero crossings of currents flowing in respective windings of the motor.

2. A circuit for operating a polyphase dc motor, comprising:

driver circuits for providing driving signals to the motor, said driving signals being discontinuous sinusoidal motor drive voltages for application to the driver circuits;

a circuit for detecting zero crossings of current flowing in the driver circuits as a result of the discontinuous sinusoidal motor drive voltages;

a circuit to change the phase of the sinusoidal motor drive voltages with respect to the current flowing in the driver circuits to align zero crossings of the current flowing in the driver circuits with zero crossings of the sinusoidal motor drive voltages, wherein said source of discontinuous sinusoidal motor drive voltages includes a source of discontinuous sinusoidal motor drive voltages having a discontinuity at said detected zero crossings of current flowing in the driver circuits, and wherein said source of discontinuous sinusoidal motor drive voltages has a discontinuity at 5° from said zero crossings of current flowing in the driver circuits.

3. A disk drive product of the type having a dc brushless, Hall-less, three-phase motor for rotating a data-containing media, comprising:

three driver circuits for providing driving signals to selected sets of coils in the motor, said driving signals being discontinuous sinusoidal motor drive voltages for application to the driver circuits;

a circuit for detecting zero crossings of current flowing in the driver circuits as a result of the sinusoidal motor drive voltages; and a circuit to change the phase of the sinusoidal motor drive voltages with respect to the current flowing in the driver circuits to align zero crossings of the current flowing in the driver circuits with zero crossings of the sinusoidal motor drive voltages, wherein said source of discontinuous sinusoidal motor drive voltages includes a source of discontinuous sinusoidal motor drive voltages having a discontinuity at said detected zero crossings of current flowing in the driver circuits, and wherein said source of discontinuous sinusoidal motor drive voltages has a discontinuity at 5° from said zero crossings of current flowing in the driver circuits.

* * * * *